June 23, 1970  W. A. BAKER  3,516,448
BORE HOLE TYPE WELLS
Filed Aug. 20, 1965  3 Sheets-Sheet 1
f
e
d
c
b
a
FIG. 1
FIG. 1a.
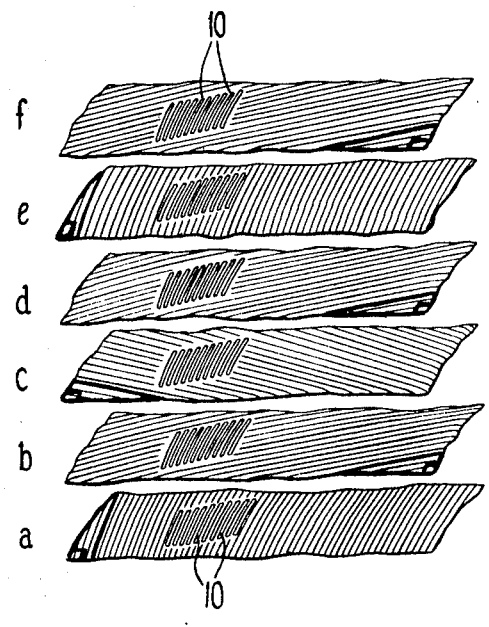
FIG. 2
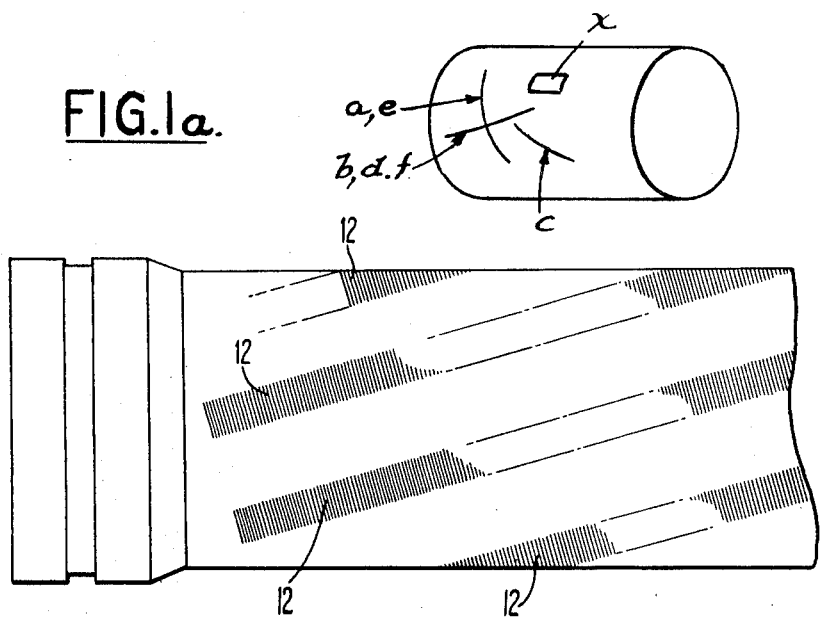
Inventor
WILLIAM ANDREW BAKER,
By
Jennings Bailey Attorney June 23, 1970  W. A. BAKER  3,516,448
BORE HOLE TYPE WELLS
Filed Aug. 20, 1965  3 Sheets-Sheet 2
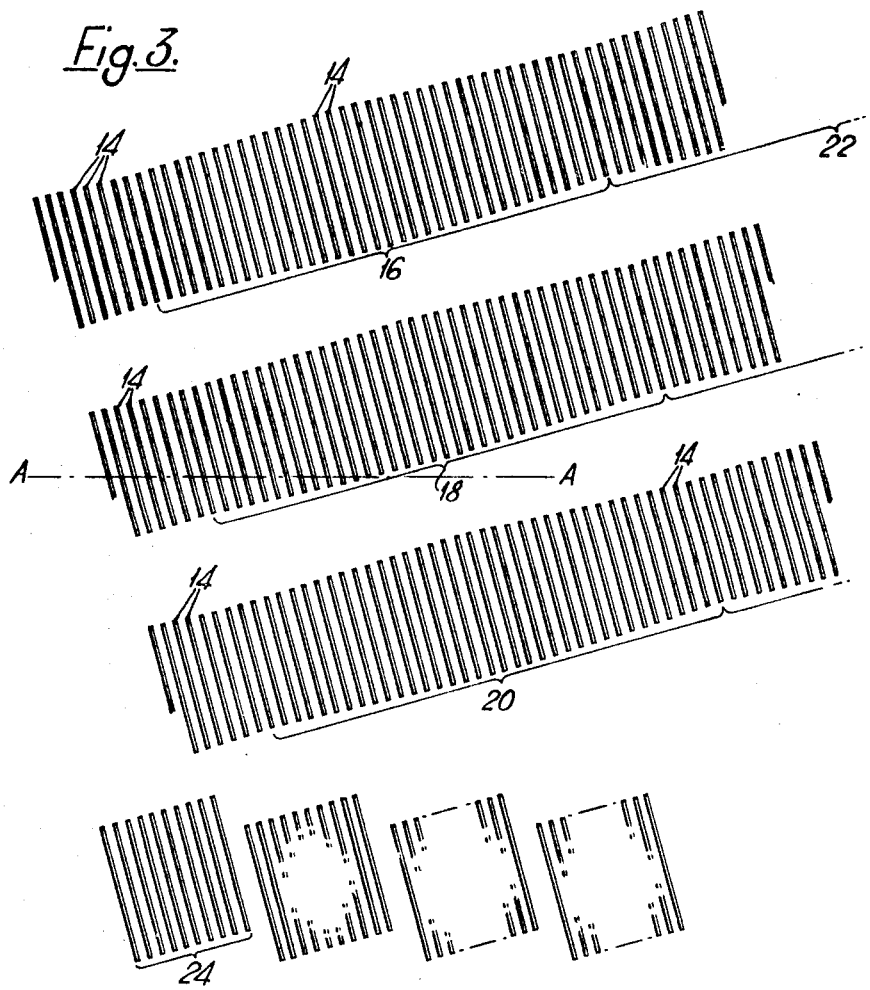
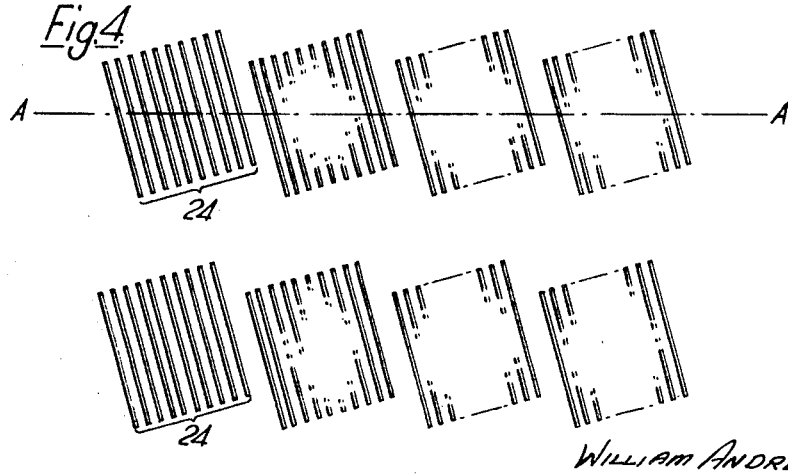
Inventor
WILLIAM ANDREW BAKER
By
Bailey, Stephens & Huettig
Attorneys June 23, 1970 W. A. BAKER 3,516,448
BORE HOLE TYPE WELLS
Filed Aug. 20, 1965 3 Sheets-Sheet 3
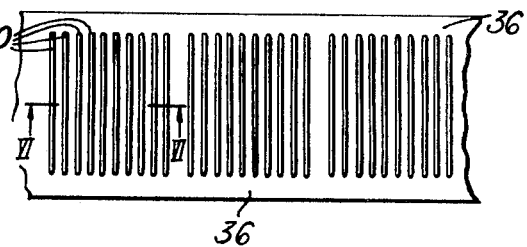
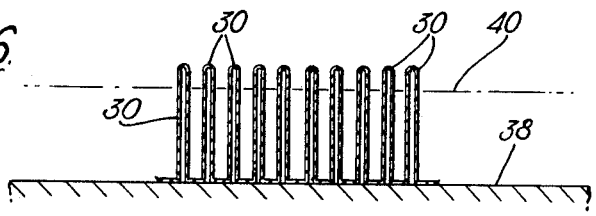
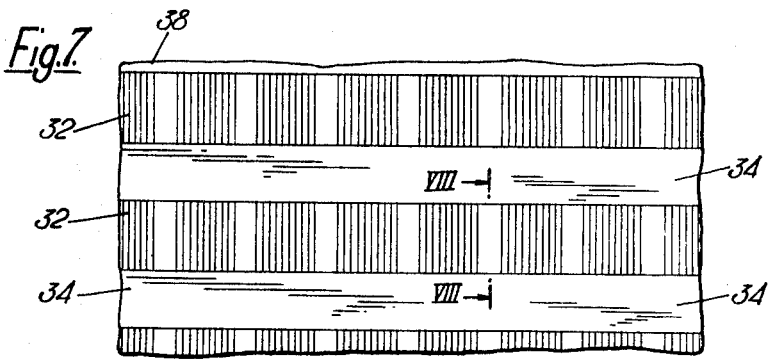
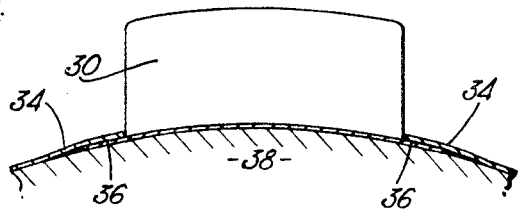
Inventor
WILLIAM ANDREW BAKER
By
Bailey, Stephens & Huettig
Attorneys

United States Patent Office 3,516,448
Patented June 23, 1970

3,516,448
BORE HOLE TYPE WELLS
William Andrew Baker, Bristol, England, assignor to Rolls Royce (Composite Materials) Limited, a British company
Filed Aug. 20, 1965, Ser. No. 481,271
Claims priority, application Great Britain, Aug. 21, 1964, 34,397/64
Int. Cl. F16l 11/02, 9/16
U.S. Cl. 138—144                    8 Claims

ABSTRACT OF THE DISCLOSURE

A pipe for lining a bore hole, the wall of the pipe being of fibre reinforced resin, reinforcing fibres of which extend in two opposite helical directions and are inclined so as to contribute respectively to the hoop strength and the longitudinal strength of the pipe, the wall having slots either moulded or cut into the wall, the slots being aligned in relation to the two said helical directions to maintain the two said strengths of the pipe, even though the slots would appear to be adverse to that maintenance.

---

A bore hole type well requires a pipe which lines the well and which has apertures in its wall to permit liquid to flow from the surrounding soil into the well. Such pipes are commonly made of steel, and the apertures are machined. The apertures may, for example, be in the form of slots of about 0.040 to 0.060 inch width. These slots prevent the gravel with which the pipe is surrounded from entering the pipe.

In many instances where bore hole type wells are used extensively to drain boggy or marshy land, for example in delta areas, by pumping out water from a depth of say 200 feet, the water is extremely corrosive owing to its chemical content, and the useful life of a metal pipe, even when made of stainless steel, is relatively short, and the expense of pumping away water continuously to maintain the land in a condition suitable for agricultural purposes is accordingly high.

The present invention is concerned with forming a pipe for bore hole type wells from a plastic.

According to the present invention, a perforated pipe for lining a bore hole type well is formed by windings of resin-impregnated fibre with slots lying parallel to at least some of the fibres from which the pipe derives mainly hoop strength. The fibre of the winding from which the pipe derives mainly hoop strength may in general lie in a direction varying anywhere between 90° to the pipe axis to, for example, about 45° to the pipe axis.

The slots are preferably machined in the pipe after the pipe has been formed by a conventional process involving the winding onto a mandrel of resin-impregnated glass fibre, followed by curing of the resin. If the slots machined in the pipe were inclined to all the fibres forming the pipe then they would sever all the fibres with the result that the pipe would have little or no hoop strength. The present invention enables most of the fibres from which the pipe derives hoop strength to remain unsevered so as to give the pipe the necessary hoop strength to resist in particular compression loading from external pressure.

Alternatively, the slots may be formed in the pipe during the actual pipe winding operation. For example, blade-like projections carried on supporting strips may be secured around the mandrel before the pipe winding operation commences, the blades being parallel to the fibres in a number of layers wound on at a relatively large helix angle, for example 75° or 79° to the axis of the pipe, so as to constitute fibres from which the pipe will derive mainly hoop strength. The blade-like projections should be spaced apart circumferentially so that longitudinal fibres can run between them to provide the necessary longitudinal strength for the pipe. After the resin of the pipe has cured, the pipe is removed from the mandrel, taking with it the strips and projections, and the projections are then removed leaving moulded slots.

The projections used to form moulded slots must naturally be of a material which does not bond with the resin of the pipe. For example, they may be of metal or of some other material which does not bond with the resin of the pipe. The strips may, on the other hand, remain in the wall of the pipe when the projections are removed, and may be of metal or plastic or of any other material. During manufacture, the strips may be bound in position on the mandrel by material which subsequently remains embedded in the wall of the cured pipe. The projections are preferably tapered radially, being thicker on the inside of the pipe, so that the slots will have a self-clearing action preventing particles of sand or grit jamming in the slots.

The accompanying drawings illustrate firstly in FIGS. 1 to 4 methods of making pipes according to this invention by first winding a normal pipe from resin-impregnated fibre and subsequently machining the slots. In these drawings:

FIGS. 1a to 1f show the positions of a few slots in relation to six different windings of resin-impregnated fibre which make up the pipe;

FIG. 1a is a perspective view of a portion of pipe for explanatory purposes;

FIG. 2 is a side view of one end of a complete pipe and shows the positions of the slots in one example;

FIG. 3 is an enlarged view showing more accurately the positions of slots in a different example somewhat similar to FIG. 2, the slots being shown in a flat developed form in relation to a pipe axis A—A; and FIG. 4 is a view similar to FIG. 3 but showing a different layout of slots.

FIG. 1 shows how the basic pipe may be wound. The pipe is formed by six layers, shown respectively in FIGS. 1a to 1f, of resin-impregnated glass fibre. The first layer shown in FIG. 1a is wound on at an angle of 79°, and the following layers are respectively wound on at angles of −22.5°, +22.5°, −22.5°, +79° and −22.5°. In this case the hoop strength of the pipe is derived mainly from the two layers wound on at 79°, and the slots lie parallel to these two layers, examples of slots 10 being shown in each figure.

Referring to FIG. 1, the solid triangles at alternate ends have their lower outer corners indicated as right angles by the small squares. The upwardly directed legs of these triangles represent lines running peripherally around the pipe, while the horizontal legs represent lines parallel to the axis of the pipe. The angles of hand are measured upwardly from the base to the hypotenuse for each triangle. It will be observed that the positive angles of the layers a, c, and e are then measured clockwise, while the negative angles of b, d and f are measured counterclockwise. These angles then correspond to the indicated lines in FIG. 1a where the rectangle X indicates the portion of the layer represented by the various parts a–f in FIG. 1.

FIG. 2 shows one end of a complete pipe and shows an arrangement in which the slots lie in a number of helical rows 12; the line joining the centres of the slots in each row being at right angles to the slots. FIG. 3 shows more accurately the layouts of slots in this form of construction.

FIG. 3 shows, in flat developed form, the positions of a number of slots 14 lying in three rows. The slots are shown at an angle of 75° to the axis A—A of the pipe, this being the angle which we prefer in the case of an 8" pipe; the angle of inclination of the hoop windings of the pipe (FIGS. 1a and 1e) should in this case also be 75°. In the case of a 10 inch pipe we use similar slots at 79° to the axis of the pipe. For an 8" pipe, as shown in FIG. 3, there would be 8 helical rows of slots evenly spaced around the pipe, and in the case of a 10" pipe there would be 10 helical rows of slots.

The slots lie in groups of 36. For example, one group 16 is identified in the top row, and corresponding groups 18 and 20 are identified in the middle and bottom rows shown in FIG. 3. The length of the slots decreases towards each end of each group, the average length being 1.83". The slots within each row are at a pitch of 0.187" and the width of each slot is 0.05".

The varying length of the slots arises out of the way in which the slots, in this particular example, are machined. The machining is carried out by a circular cutter consisting of 36 axially spaced cutting discs of equal diameter. Each disc cuts one of the slots in each group of 36 slots. The cutting discs revolve about a common axis, and are fed into the tube as evenly as possible, with the result that the discs towards the middle bite further into the tube owing to the curvature of the wall of the tube.

A machine for cutting the slots of FIG. 3 is described in pending application No. 13,959/65. As described in that application, the tube is moved axially and rotated about its axis while the cutter is fed intermittently into the tube so as to form a part of each of the eight rows of slots during each revolution of the tube. If, for example, the movement of the tube with respect to the cutter is upwards as viewed in FIG. 3, the speeds of rotation and axial translation of the tube are such that the cutter forms firstly the group 16 of the slots in the first row, and when the cutter makes its next plunge into the tube, the group 18 of slots in the next adjacent row is machined, and at the next plunge of the cutter the group 20 is machined, and so on. The eighth plunge of the cutter following the plunge which forms the group 16 results in the formation of a group 22 which forms a continuation of the row containing the group 16; it will be appreciated that the axial and rotational movements of the tube are accurately related in order to achieve this.

FIG. 4 shows a different layout of slots. As in the case of the example shown in FIG. 3, the slots are at an angle of 75° to the axis A—A of the tube, this being the arrangement for an 8" diameter pipe. For a 10" diameter pipe, the slots would again be at an angle of 79° to the axis of the pipe. The slots are in groups, the pitch within each group being 0.175 inch. The length of each slot is 1.92 inches.

It will be seen that the groups of slots lie in rows which are parallel to the axis of the pipe. 8 inch and 10 inch diameter pipes require respectively 8 and 10 of these rows evenly spaced around the pipe.

The slots of FIG. 4 are machined by a cutter consisting of axially spaced cutting discs. The machining is carried out by rotating the pipe without axial translation while the cutter makes 8 or 10 plunges to form one set of groups 24 of slots around the pipe, after which the pipe is moved axially so that, during the next revolution of the pipe, the cutter can form another set of groups around the pipe aligned with the first set so as to form the required rows of groups of slots.

A pipe slotted in accordance with FIG. 4 may have longitudinal fibres lying parallel to the pipe axis. Alternatively, if the fibres from which the longitudinal strength of the pipe is derived are helically wound then there will still be fibres of sufficient length remaining uncut after the slots have been formed to ensure that the uncut lengths overlap to give a significant amount of longitudinal strength to the pipe.

FIGS. 5 to 8 of the accompanying drawings show a different method of making a perforated pipe according to this invention, in which the slots are in effect moulded into the pipe during the pipe-winding operation. In FIGS. 5 to 8:

FIG. 5 is a view of part of one lining strip used in the manufacture of the pipe;

FIG. 6 is a section on the line VI—VI in FIG. 5;

FIG. 7 shows parts of two adjacent lining strips with connecting sealing strips; and FIG. 8 is an enlarged fragmentary section on the line VIII—VIII in FIG. 7.

In this alternative method of pipe manufacture, each slot is defined by a thin lining of plastic moulded integrally with or pressed out of the lining strip shown in FIG. 5. The linings have the reference numeral 30 and are shown most clearly in FIG. 6. It will be seen that the linings lie in spaced groups of 10 in the particular example shown in the drawings, but other arrangements are possible.

During manufacture, a number of lining strips 32 are laid around the mandrel on which the pipe is wound, and the lining strips are connected by sealing strips 34 which are secured, for example by a resin adhesive, to margins 36 of the lining strips. Finally the resin-impregnated fibre forming the pipe is wound around the mandrel 38, the windings from which the pipe will derive mainly its hoop strength being parallel to the slot linings 30; the fibre is built up to the height of the line 40 shown in FIG. 6 so as to leave the tops of the linings projecting out of the fibre winding, and the tops of the linings are finally cut off so that each lining has an open outer end defining the mouth of the slot.

The lining strips may be laid parallel to the axis of the mandrel 38, in which case the hoop windings of the pipe should be substantially at right angles to the pipe axis. Alternatively, the lining strips and sealing strips may be wound helically onto the mandrel, in which case the hoop windings of the pipe may be wound on at a pronounced helix angle; for example, if the lining strips lie at 15° to the axis of the mandrel, then the hoop windings may be at 75° to the axis of the mandrel. In each case, the hoop windings fill not only the spaces between the groups of linings, but also the spaces between the individual lining in each group.

I claim:

1. A perforated pipe for lining a bore hole type well, the pipe comprising a plurality of successively radially superposed layers of fibre windings impregnated with resin, at least one of the said layers having its fibres extending in a first helical direction, which direction is such that those fibres contribute principally to the hoop strength of the pipe, at least a further one of the said layers having its fibres extending in a second helical direction, which direction is such that those fibres contribute principally to the longitudinal strength of the pipe, the second helical direction being of a hand opposite to the first helical direction, the pipe having in its wall a plurality of adjacent perforations, said perforations consisting of parallel slots, the lengths of which slots are substantially uniform and extend generally in the said first helical direction, said slots being positioned such that at least the majority of the fibres which extend in the said first helical direction are continuous and pass between the slots, and such that an imaginary line joining the centres of adjacent slots lies substantially parallel to the said second helical direction.

2. A perforated pipe as claimed in claim 1 in which the slots are unlined.

3. A perforated pipe as claimed in claim 1 in which the slots are lined by means of lining strips.

4. A perforated pipe as claimed in claim 1 in which the said first helical direction is substantially perpendicular to the said second helical direction.

5. A perforated pipe as claimed in claim 1, in which said slots are arranged in groups spaced angularly around the axis of the pipe, the spaces between such groups extending substantially in said second helical direction.

6. A perforated pipe for lining a bore hole type well, the pipe comprising a plurality of successively radially superposed layers of fibre windings impregnated with resin, at least one of the said layers having its fibres extending in a first helical direction, which direction is inclined at a relatively small angle to a plane perpendicular to the axis of the pipe such that those fibres contribute principally to the hoop strength of the pipe, at least a further one of said layers having its fibres extending in a second helical direction, which direction is inclined at a substantially greater angle to said plane such that those fibres contribute principally to the longitudinal strength of the pipe, the second helical direction being of a hand opposite to that of the said first helical direction, the pipe having in its wall a plurality of adjacent perforations, said perforations consisting of parallel slots, the lengths of which slots are substantially uniform and extend substantially in the said first helical direction, said slots being positioned such that at least the majority of the fibres which extend in the said first helical direction are continuous and pass between the slots, and such that an imaginary line joining the centers of adjacent slots lies at least substantially parallel to said second helical direction.

7. A perforated pipe as claimed in claim 6, having at least one further layer having its fibres extending in a third helical direction which direction is such that those fibres contribute principally to the longitudinal strength of the pipe, said third helical direction being of a hand opposite to that of said second helical direction, said third helical direction being inclined at a substantially greater angle to said plane than said first helical direction.

8. A perforated pipe as claimed in claim 6, in which said slots are arranged in groups spaced angularly around the axis of the pipe, the spaces between such groups extending substantially in said second helical direction.

References Cited

UNITED STATES PATENTS

| Re. 2,965 | 6/1868 | Mack | 166—227 |
| Re. 20,648 | 2/1938 | Harrington | 166—227 |
| 1,268,366 | 6/1918 | Layne | 166—236 |
| 1,657,130 | 1/1928 | McEvoy | 166—227 |
| 1,800,642 | 4/1931 | Johnson | 166—227 |
| 2,742,931 | 4/1956 | Ganahl | 138—144 |
| 2,791,241 | 5/1957 | Reed | 138—144 |
| 3,087,560 | 4/1963 | Dodson | 166—236 |
| 3,107,698 | 10/1963 | Baker et al. | 138—144 |
| 3,194,275 | 7/1965 | Biggs et al. | 138—144 |

FOREIGN PATENTS 1,057,779  5/1959  Germany.

LAVERNE D. GEIGER, Primary Examiner

D. MASSENBERG, Assistant Examiner

U.S. Cl. X.R.

156—175, 180; 161—109, 139, 143